(12) United States Patent
Kautzky (10) Patent No.: US 9,013,831 B2
(45) Date of Patent: Apr. 21, 2015

(54) WRITE POLE FABRICATED USING A CARBON HARD MASK AND METHOD OF MAKING

(75) Inventor: Michael Christopher Kautzky, Eagan, MN (US)

(73) Assignee: Seagate Technology LLC, Cupertino, CA (US)

( * ) Notice: Subject to any disclaimer, the term of this patent is extended or adjusted under 35 U.S.C. 154(b) by 162 days.

(21) Appl. No.: 13/486,063

(22) Filed: Jun. 1, 2012

(65) Prior Publication Data

US 2012/0236437 A1 Sep. 20, 2012

Related U.S. Application Data

(63) Continuation-in-part of application No. 12/489,275, filed on Jun. 22, 2009, now Pat. No. 8,191,238.

(51) Int. Cl.
*G11B 5/127* (2006.01)
*G11B 5/31* (2006.01)

(52) U.S. Cl.
CPC ............ *G11B 5/3116* (2013.01); *G11B 5/1278* (2013.01); *G11B 5/3163* (2013.01)

(58) Field of Classification Search
USPC ............... 360/125.03, 125.3, 125.06, 125.09, 360/125.12, 125.16, 125.17, 125.26
See application file for complete search history.

(56) References Cited

U.S. PATENT DOCUMENTS

| | | | |
|---|---|---|---|
| 6,316,167 B1 | 11/2001 | Angelopoulos | |
| 6,573,167 B2 | 6/2003 | Xing | |
| 6,750,127 B1 | 6/2004 | Chang | |
| 6,835,663 B2 | 12/2004 | Lipinski | |
| 7,111,382 B1 | 9/2006 | Knapp | |
| 7,206,166 B2 | 4/2007 | Notsuke | |
| 7,477,481 B2 | 1/2009 | Guthrie | |
| 7,508,627 B1* | 3/2009 | Zhang et al. | 360/125.12 |
| 7,716,813 B2* | 5/2010 | Lee et al. | 29/603.12 |
| 7,743,487 B2 | 6/2010 | Baer | |
| 8,018,677 B1* | 9/2011 | Chung et al. | 360/125.03 |
| 8,305,711 B2* | 11/2012 | Li et al. | 360/125.31 |
| 8,625,235 B2* | 1/2014 | Takano et al. | 360/125.15 |
| 2005/0241140 A1 | 11/2005 | Baer | |
| 2007/0245544 A1 | 10/2007 | Allen | |
| 2007/0266549 A1 | 11/2007 | Gill | |
| 2008/0127481 A1* | 6/2008 | Lee et al. | 29/603.15 |
| 2010/0178529 A1* | 7/2010 | Marinero | 428/815 |
| 2011/0261485 A1* | 10/2011 | Pentek et al. | 360/122 |
| 2013/0022840 A1* | 1/2013 | Hsiao et al. | 428/815.2 |

OTHER PUBLICATIONS

D.P. Adams et al., "Focused Ion Beam Milling of Diamon: Effects of $H_2O$ on Yield, Surface Morphology and Microstructure", from J. Vac. Sci. Technol. B21(6) (Nov./Dec. 2003) pp. 2334-2343.

T.J. Stark et al., "$H_2O$ Enhanced Focused Ion Beam Micromachining", from J. Vac. Sci. Technol. B13(6) (Nov./Dec. 1995), pp. 2565-2569.

* cited by examiner

*Primary Examiner* — Allen T Cao
(74) *Attorney, Agent, or Firm* — Mueting, Raasch & Gebhardt, P.A.

(57) ABSTRACT

A magnetic writer comprises a write pole, a substrate and a non-magnetic, oxygen-free buffer material. The write pole has a leading edge, a trailing edge, a first side and second side. The substrate is at the leading edge of the write pole. The non-magnetic, oxygen-free buffer material is located between the write pole and the substrate, and the oxygen-free buffer material is selected from Re, Ru, Os, Rh, Ir, and combinations thereof.

6 Claims, 6 Drawing Sheets

WRITE POLE FABRICATED USING A CARBON HARD MASK AND METHOD OF MAKING

PRIORITY

This application is a Continuation-in-Part of U.S. patent application Ser. No. 12/489,275, entitled A METHOD FOR FORMING A MAGNETIC WRITER, filed on Jun. 22, 2009, the disclosure of which is incorporated in its entirety by reference thereto.

BACKGROUND

Magnetic transducing heads typically include both a write element and a read element. The write element is configured to generate magnetic fields that align magnetic moments of the recording data to represent bits of data.

To write data to a recording medium, an electric current can be applied to conductive coils to induce a magnetic field in the medium under a write pole. The write pole can define the track width of the data written. More specifically, in perpendicular recording the magnetic signals can be conducted through the trailing edge of the write pole in a manner that orients the magnetic moments of the recording medium perpendicularly to the surface of the recording medium. The shape of the write pole may be projected and reproduced on the magnetic medium during the write process. Thus, the track width can be defined by the width of the write pole at the surface facing the recording medium (i.e. air bearing surface).

One way to increase the recording capacity of medium is to decrease the width of the write pole. Sub-100 nm features (write poles having a width of less than 100 nm) can enable this increase in capacity. A write pole can be fabricated by depositing magnetic material, a hard mask and a photoresist patterning mask on a substrate. After deposition, the photoresist is patterned by photolithography. The photoresist is used to pattern the hard mask material using a material removal process such as reactive ion etching (RIE). Then, using the hard mask as a pattern, select portions of the magnetic material are removed by a milling process to form a write pole. Previously, hard masks were formed from $Al_2O_3$, $SiO_2$, SiON, poly-Si and other similar materials. However, these hard masks are not effective for the fabrication of sub-100 nm write poles because in some cases the patterned hard masks of these materials must be thicker than 100 nm. That is, the required thickness of the hard mask was thicker than the width of the mask, resulting in decreased stability of the hard mask. The materials of these hard masks also suffered from negative contamination issues, such as contamination from oxygen ions. An improved method of forming features on magnetic transducing heads is necessary.

SUMMARY

A magnetic writer comprises a write pole, a substrate and a non-magnetic, oxygen-free buffer material. The write pole has a leading edge, a trailing edge, a first side and second side. The substrate is at the leading edge of the write pole. The non-magnetic, oxygenfree buffer material is located between the write pole and the substrate.

DETAILED DESCRIPTION

Figure 1:
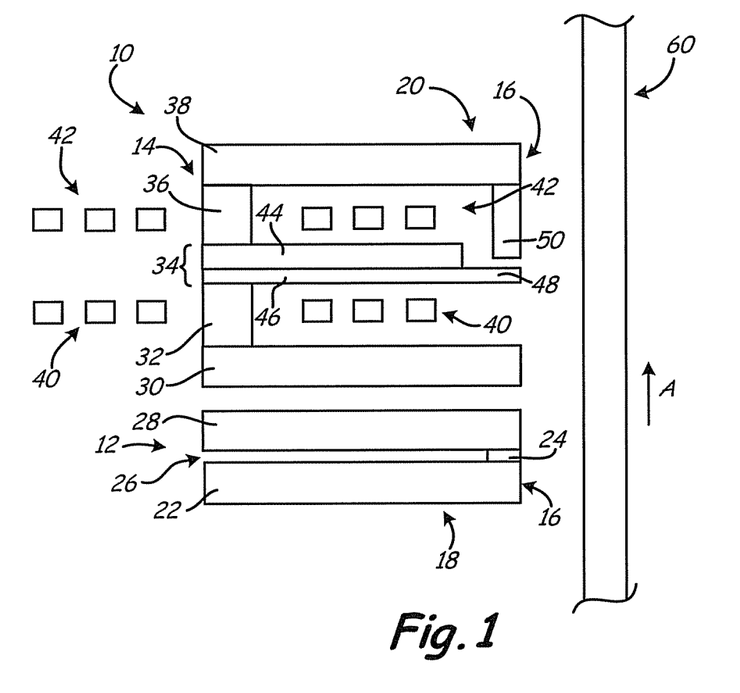
FIG. 1 is a cross-sectional view of a recording head taken substantially normal to a magnetic medium.

FIG. 1 is a cross-sectional view of recording head 10, which includes reader 12 and writer 14 that define medium confronting surface 16. Reader 12 and writer 14 each have medium confronting surface 16, leading edge 18 and trailing edge 20. Reader 12 includes bottom shield structure 22, read element 24, read gap 26, and top shield structure 28. Writer 14 includes first return pole 30, first magnetic stud 32, write pole 34, second magnetic stud 36, second return pole 38, first conductive coil 40, and second conductive coil 42. Write pole 34 includes yoke 44, write pole body 46 and write pole tip 48. Front shield 50 shields write pole 34.

Reader 12 and writer 14 are multi-layered devices having features formed by layered materials. In one example, as illustrated in FIG. 1, writer 14 is stacked on reader 12 in a piggyback configuration in which layers are not shared between the two elements. In other examples, reader 12 and writer 14 can be arranged in a merged-head configuration (in which layers are shared between the two elements) and/or reader 12 may be formed on writer 14.

On reader 12, read gap 26 is defined on medium confronting surface 16 between terminating ends of bottom shield 22 and top shield 28. Read element 24 is positioned in read gap 26 adjacent medium confronting surface 16. Read element 24 may be any variety of different types of read elements, such as a magnetoresistive (MR) element, a tunneling magnetoresistive (TMR) read element or a giant magnetoresistive (GMR) read element.

Recording head 10 confronts magnetic medium 60 at medium confronting surface 16, such as an air bearing surface (ABS). Reader 12 and writer 14 are carried over the surface of magnetic medium 60, which is moved relative to recording head 10 as indicated by arrow A such that write pole 34 trails first return pole 30 and leads second return pole 38. Writer 14 has leading edge 18 and trailing edge 20 defined by the movement of magnetic medium 60. Write pole 34 is used to physically write data to magnetic medium 60. In order to write data to magnetic medium 60, current is caused to flow through second conductive coil 42. The magneto motive force in the coils causes magnetic flux to travel from write pole tip 48 perpendicularly through magnetic medium 60, and through second return pole 38 and second magnetic stud 36 to provide a closed magnetic flux path. The direction of the write field at the medium confronting surface of write pole tip 48, which is related to the state of the data written to magnetic medium 60, is controllable based on the direction that the current flows through second conductive coil 42.

Reader 12 reads data from magnetic medium 60. In operation, magnetic flux from a surface of magnetic medium 60 causes rotation of a magnetization vector of read element 24, which in turn causes a change in electrical resistivity of read element 24. The change in resistivity of read element 24 can be detected by passing a current through read element 24 and measuring a voltage across read element 24. Shields 22 and 28, which may be made of a soft ferromagnetic material, guide stray magnetic flux from magnetic medium 60 away from read element 24 outside the area of magnetic medium 60 directly below read element 24.

In writer 14, first return pole 30, second return pole 38, first magnetic stud 32, and second magnetic stud 36 can comprise soft magnetic materials, such as NiFe. Conductive coils 40 and 42 can comprise a material with low electrical resistance, such as Cu. Write pole body 44 can comprise a high moment soft magnetic material, such as CoFe. First conductive coil 40 surrounds first magnetic stud 32, which magnetically couples write pole 34 to first return pole 30. Second conductive coil 42 surrounds second magnetic stud 36, which magnetically couples write pole 34 to second return pole 38. First conductive coil 40 passes through the gap between first return pole 30 and write pole 34, and second conductive coil 42 passes through the gap between write pole 34 and second return pole 38.

Magnetic medium 60 is shown merely for purposes of illustration, and may be any type of medium that can be used in conjunction with recording head 10, such as composite media, continuous/granular coupled (CGC) media, discrete track media, and bit-patterned media.

Reader 12 and writer 14 are shown merely for purposes of illustrating a construction that may be used in a recording head 10 and variations on the designs may be made. For example, a single trailing return pole may be provided on writer 14 instead of the shown dual return pole writer configuration, or alternative coil 40, 42 designs can be used.

Figure 2:
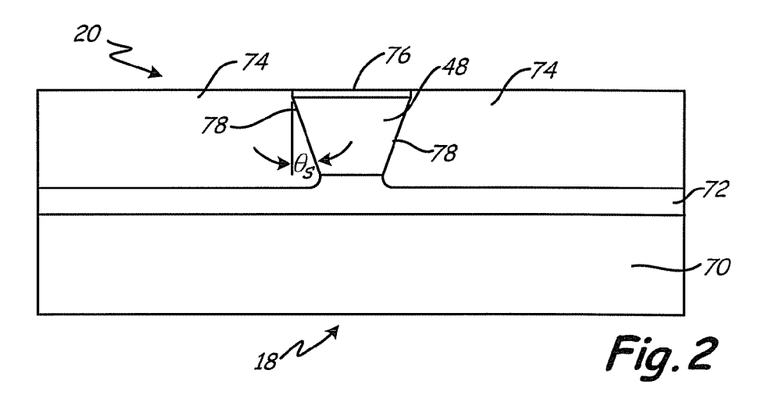
FIG. 2 is an end view of a write pole having a non-magnetic, oxygen-free buffer layer and steep sidewalls as viewed from the magnetic medium.

FIG. 2 is an end view of write pole 48 as seen from magnetic medium 60. Write pole 48 is formed on substrate 70 and oxygen-free buffer layer 72, and is surrounded by insulating layer 74. Chemical-mechanical polishing (CMP) stop layer 76 is formed on top of write pole. Write pole 48 has sidewalls 78, which form sidewall angles $8s$ with the vertical axis. Substrate 70 can include any thin films of writer 14 or reader 12 previously formed during upstream fabrication.

Oxygen-free buffer layer 72 is non-magnetic. In one example, oxygen-free buffer layer 72 is a non-magnetic refractory metal or a non-magnetic, non-oxide nitride, carbide or boride or combinations thereof. In another example, oxygen-free buffer layer 72 is selected from W, Cr, Mo, V, Nb, Ta, Hf, Zr, Ti, AlN, $B_4C$, TaC, TiN, $TiB_2$, WC, HfC, $Cr_3C$ and combinations thereof.

Write pole 48 is located adjacent oxygen-free buffer layer 72 on the opposite side of substrate 70. Write pole 48 comprises a magnetic material. For example, write pole 48 can be formed from a high Bsat or high moment soft magnetic material such as CoFe. As illustrated in FIG. 2, write pole 48 can be fabricated to have a trapezoidal or tapered shape. This trapezoidal shape prevents adjacent track writing problems associated with skew, which occurs when write pole 48 is positioned at an angle relative to the medium and portions of write pole 48 are outside of the desired track. The use of oxygen-free buffer layer 72 and a carbon hard mask during the fabrication of a trapezoidal shaped write pole 48 enables write pole 48 to be fabricated with a larger (or steeper) sidewall angle $8s$ as will be described later.

Insulating layer 74 is located on top of selected portions of oxygen-free buffer layer 72. Insulating layer 74 surrounds and insulates write pole 48. Insulating layer 74 comprises a non-magnetic insulating material. In one example, insulating layer 74 comprises alumina. Insulating layer 74 has a level surface at trailing edge 20.

Finally, chemical-mechanical polishing (CMP) stop layer 76 is located adjacent write pole 48 on the opposite side of oxygen-free buffer layer 72. CMP stop layer 76 comprises amorphous carbon (a-C). CMP stop layer 76 functions as a stop layer during fabrication of the write element and assists in forming the level surface of insulating layer 74 at trailing edge 20.

FIGS. 3-7 are cross-sectional views of a substrate during fabrication of write pole 48 and illustrate a method of making write pole 48 having a large sidewall angle $8s$ using a carbon hard mask. The steps include forming a layered substrate or structure, patterning a cap layer, patterning a carbon hard mask, forming the write pole and backfilling the substrate.

Figure 3:
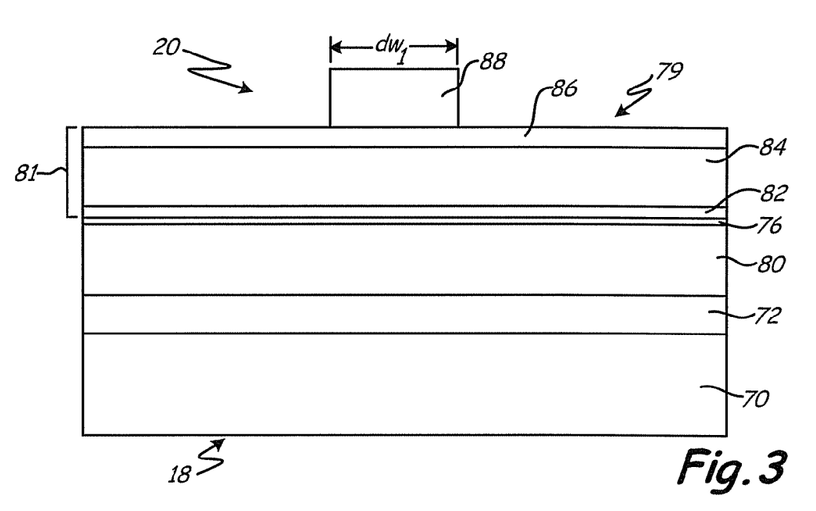
FIG. 3-FIG. 7 illustrate the process for forming the write pole having a nonmagnetic, oxygen-free buffer layer and steep sidewalls as shown in FIG. 2.

First, as illustrated in FIG. 3, layers are deposited on substrate 70 to form layered structure 79. With substrate 70 as a base, oxygen-free buffer layer 72 is deposited, then write pole material 80, CMP stop layer 76, hard mask 81 (including $Al_2O_3$ spacer layer 82, carbon hard mask 84 and cap layer 86) and photoresist mask 88.

Oxygen-free buffer layer 72 is a non-magnetic material. In one example, oxygenfree buffer layer 72 is a non-magnetic refractory metal or a non-magnetic, non-oxide nitride, carbide or boride or a combination thereof. In another example, oxygen-free buffer layer 72 is selected from W, Cr, Mo, V, Nb, Ta, Hf, Zr, Ti, AlN, $B_4C$, TaC, TiN, $TiB_2$, WC, HfC, $Cr_3C$ and combinations thereof. In other embodiments, oxygen-free buffer layer 72 is selected from Re, Ru, Os, Rh, Ir, and combinations thereof. In other embodiments, oxygen-free buffer layer 72 is selected from Ru. Oxygen-free buffer layer 72 is a thin layer. In one example, oxygen-free buffer layer 72 is about 3000 angstroms thick. Oxygen-free buffer layer 72 does not adversely affect the sidewall mill resistance of carbon hard mask 84, allowing write pole 48 to be formed with larger sidewall angles.

Write pole material 80 is a high moment magnetic material that will be formed into write pole 48. In one example, write pole material 80 has a magnetic moment of at least 2.0 tesla (T). In another example, write pole material 80 has a magnetic moment of about 2.4 T. In a further example, write pole material 80 includes at least one of CoFe, CoFeNi, CoFeRh, CoFeRu, CoFePt, CoFePd and NiFe. Write pole material 80 is a thin layer. In one example, write pole material 80 is about 2000 angstroms thick.

CMP stop layer 76 is layered on write pole material 80. CMP stop layer 76 is formed from amorphous carbon (a-C). In one example, CMP stop layer 76 is about 100 angstroms thick. Hard mask 81 consisting of $Al_2O_3$ spacer layer 82, carbon hard mask 84 and cap layer 86 is deposited on CMP stop layer 76. Carbon hard mask 84 is formed from amorphous carbon (a-C) or diamond like carbon (DLC). Carbon hard mask 84 is used to pattern write pole material 80. In one example, carbon hard mask 84 is between about 4000 and 6000 angstroms thick. Carbon hard mask 84 can be deposited by magnetron sputtering techniques, reactive magnetron sputtering techniques, plasma-enhanced chemical vapor deposition (PECVD) or ion beam deposition (IBD). In one example, carbon hard mask 84 is deposited by direct current (DC) magnetron sputtering of a graphite target in argon gas with a radio frequency (RF) substrate bias. Specific features and characteristics of carbon hard mask 84 will be described later.

Cap layer 86 is formed from a material having a high etch selectivity to photoresist 88. In one example, cap layer 86 is formed from a silicon based material, such as silicon oxinitride (SiON), silicon nitride or silicon oxide. Cap layer 86 can be deposited on carbon hard mask 84 by plasma-enhanced chemical vapor deposition (PECVD). Cap layer 86 can function as both an anti-reflective coating and an etch mask for carbon hard mask 84. In one example, cap layer 86 is between about 50 and about 150 nm thick. Carbon hard mask 84 and photoresist 88 can be removed using the same chemistry, while cap layer 86 is removed using a different chemistry. Therefore, cap layer 86 prevents undesirably etching carbon hard mask 84 during the patterning of photoresist 88. Hard mask 81 can include additional layers above or below carbon hard mask 84. For example, hard mask 81 can include an additional layer to improve adhesion of hard mask 81 to write pole material 80.

Photoresist 88 is deposited on top of cap layer 86. Photoresist 88 is patterned using a photolithography process. Photolithography uses light to transfer a pattern from a photomask to light sensitive photoresist 88. Photoresist 88 in FIG. 3 has already been patterned to have width dW1.

Figure 4:
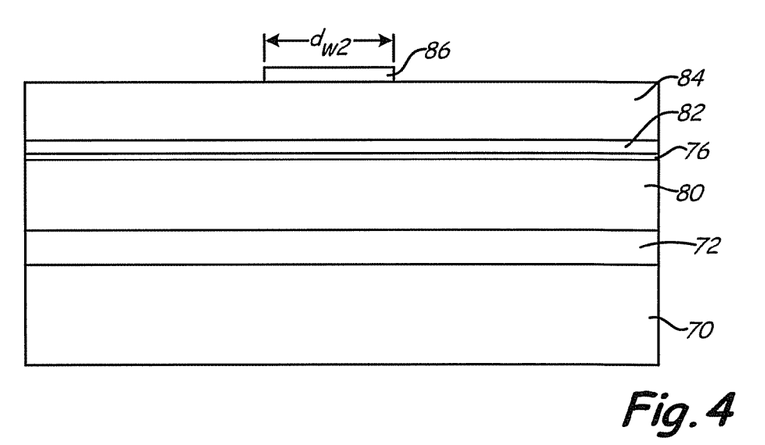

With patterned photoresist 88 in place, cap layer 86 is etched and photoresist 88 is removed as shown in FIG. 4. During the etching, any portion of cap layer 86 not covered by photoresist 88 will be removed. Cap layer 86 can be etched using either reactive ion etching (RIE) or plasma etching. In one example, cap layer 86 is etched by RIE using fluorinated chemistry, such as $CF_4$. After patterning, cap layer 86 has width dw2.

Figure 5:
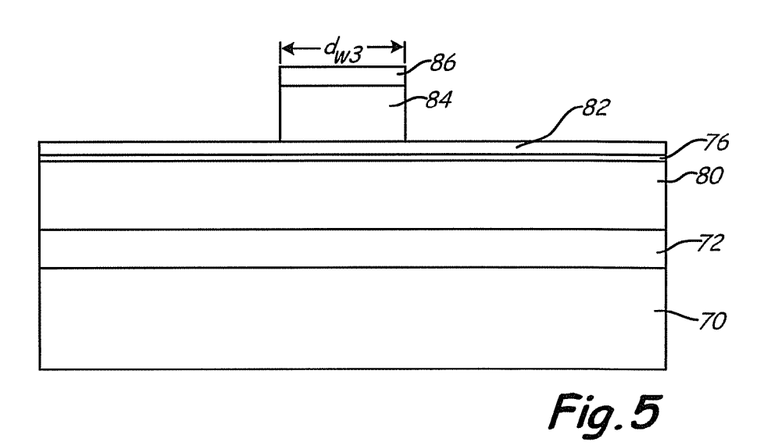

Next, carbon hard mask 84 is etched as shown in FIG. 5. Cap layer 86 is used as a pattern when etching carbon hard mask 84 so that portions of carbon hard mask 84 not covered by cap layer 86 are removed. Carbon hard mask 84 can be etched using reactive ion etching (RIE) or plasma etching. In one example, carbon hard mask 84 is etched by RIE using oxygen chemistry. The etching process is selected so that it does not remove CMP stop layer 76. After patterning, carbon hard mask 84 has width dw3.

Figure 6:
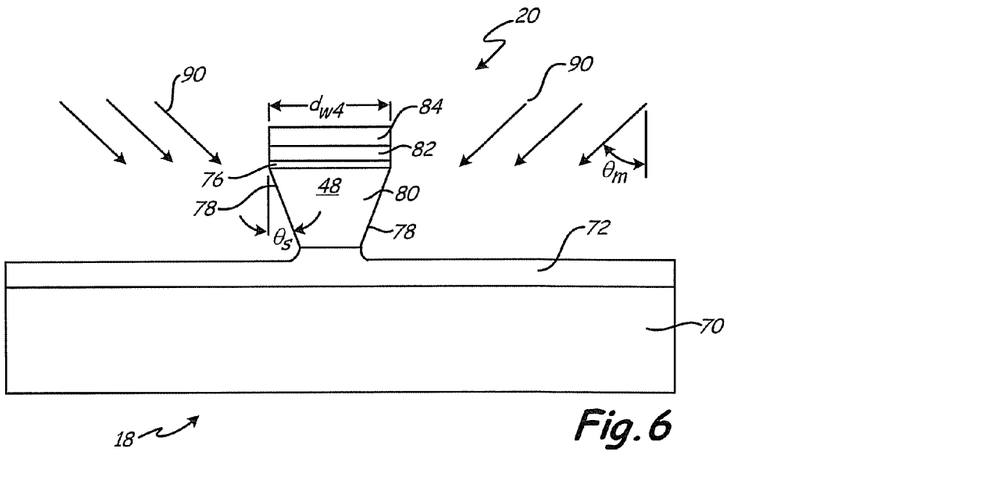

Then, as shown in FIG. 6, CMP stop layer 76 and write pole material 80 are milled to form trapezoidal write pole 48 with sidewalls 78. Carbon hard mask 84 is used as a pattern, and portions of write pole material 80 and CMP stop layer 76 not covered by carbon hard mask 84 are removed by the milling process. The milling process will also remove cap layer 86 and a portion of carbon hard mask 84. In one example, argon ion milling is used. In argon ion milling, argon ions (illustrated by arrows 90) are accelerated towards write pole material 80. Mill angle 8m of the argon ions can be controlled during the milling process to control the shape of write pole 48. In one example, the argon ions strike CMP stop layer 76 and write pole material 80 nearly vertically (mill angle 8m is small) until the majority of the write pole material is removed. Then, mill angle 8m is increased so that write pole material 80 is milled slightly laterally, forming a trapezoidal or tapered write pole 48. The high mill resistivity (or low mill rate) of carbon hard mask 84 maintains the desired width of write pole material 80 at trailing edge 20 while sidewalls 78 can be etched to form a trapezoidal shape. After the milling process, carbon hard mask 84 and thus trailing edge 20 of write pole 48 has width dw4. As described further below, the combination of oxygen-free buffer layer 72 and carbon hard mask 84 allow write pole 48 to be formed with steeper sidewalls 78 (sidewall angle 8s is increased).

During the milling process, a portion of oxygen-free buffer layer 72 is removed, as illustrated in FIG. 6. Oxygen-free buffer layer 72 is sized so that a portion of oxygen-free buffer layer 72 can be removed during the milling process without exposing substrate 70. As discussed above, the milling process removes cap layer 86 and a portion of carbon hard mask 84. Following the milling process, spacer layer 82 and the remaining portion of carbon hard mask 84 can be removed. For example, an ashing process using oxygen or hydrogen chemistry can be used to remove spacer layer 82 and carbon hard mask 84.

Figure 7:
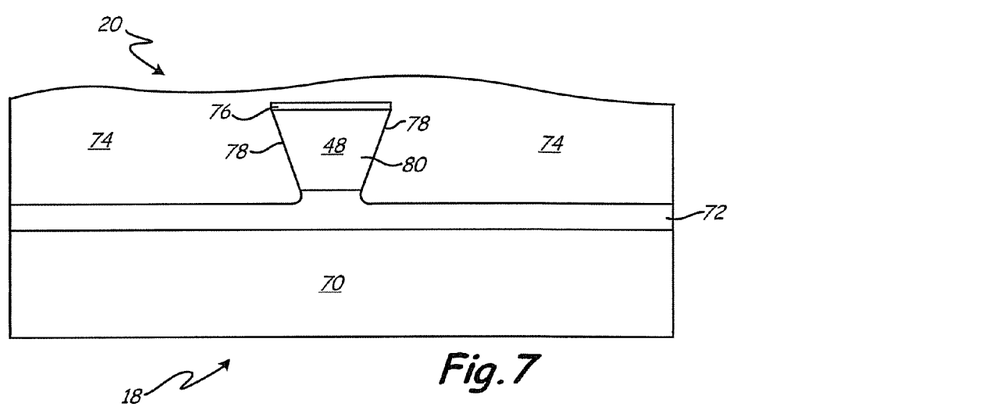

After forming write pole 48 and removing spacer layer 82 and carbon hard mask 84, substrate 70 is backfilled with insulating layer 74, as illustrated in FIG. 7. Insulating layer 74 is deposited on oxygen-free buffer layer 72, and surrounds and insulates write pole 48. In one example, insulating layer 74 is alumina ($Ah0_3$) that is deposited by a physical vapor deposition (PVD) process such as radio frequency (RF) reactive.

Backfilling results in an uneven surface at trailing edge 20. Chemical-mechanical planarization (CMP) is used to level trailing edge surface 20. Insulating layer 74 is subjected to the CMP process until CMP stop layer 76 is reached, forming the write element shown in FIG. 2. Downstream processing of the write element can include removing CMP stop layer 76 such as by oxygen plasma, and the remaining features of the writer can be manufactured by processes known in the art.

Figure 8:
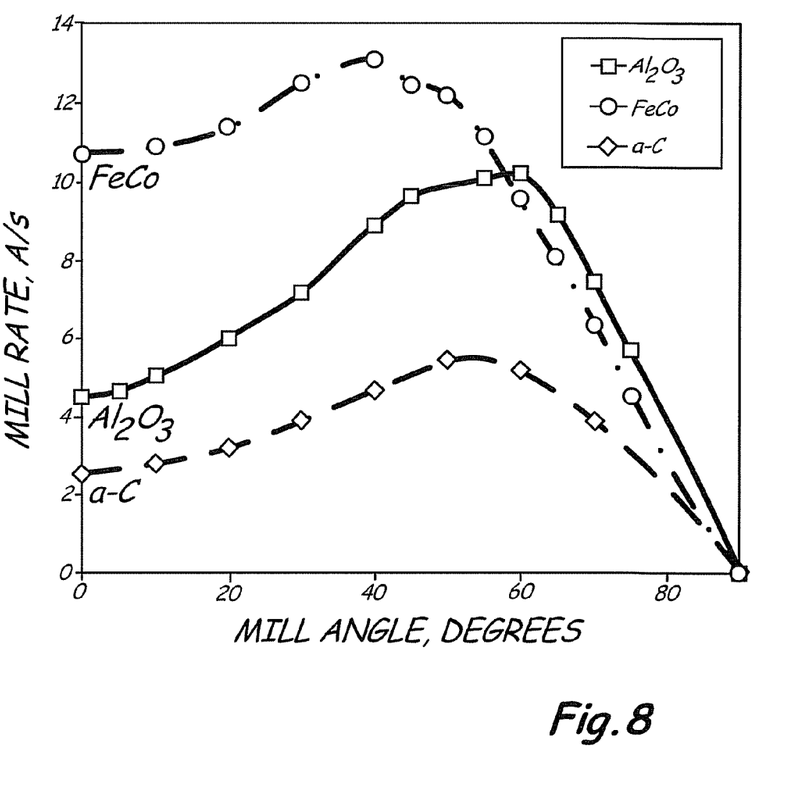
FIG. 8 is a chart of the mill rate in angstroms per second of alumina, cobalt iron and amorphous carbon over a range of mill angles in degrees.

As discussed above, in order for the storage capacity of medium to be increased, the width of writer 14, and specifically of write pole 48, must be reduced to allow more tracks per inch to be written on the medium. Write pole 48 must be fabricated within tight tolerances. Accurately transferring the pattern to the write pole material 80 contributes to maintaining write pole 48 within the allotted tolerances. In order to accurately pattern write pole material 80, the hard mask used in the patterning must have a lower mill rate than write pole material 80 so that the hard mask is not removed during the milling of write pole 48. Further, in order to form a trapezoidal shaped write pole 48, which involves a larger mill angle, the hard mask must have a lower mill rate than write pole material 80 at all mill angles. FIG. 8 shows the mill rates of amorphous carbon (a-C) (used in carbon hard mask 84) and FeCo (used in write pole material 80). Amorphous carbon has a lower mill rate at all angles compared FeCo, allowing carbon hard mask 84 formed of a-C to accurately pattern FeCo write pole material 80 during the milling process.

FIG. 8 also shows the mill rate of alumina ($Ah0_3$). Alumina can be used as a hard mask in place of carbon hard mask 84. However, at mill rate angles 8m greater than about 55 degrees, alumina has a higher mill rate than FeCo. At these large mill angles, portions of an alumina hard mask will be removed faster than the FeCo write pole material. This characteristic of alumina is especially important when fabricating trapezoidal write poles, which use larger mill angles. An alumina hard mask will not accurately transfer the desired pattern (i.e. width) to FeCo. The alumina hard mask will also be unable to maintain the width of the write pole material at the trailing edge because the hard mask will be milled away. This causes the sidewalls of the write pole to be less steep (the sidewall angle 8s is less so that the sidewalls are more vertical). The use of carbon hard mask 84 improves the accuracy of the pattern transferred to write pole material 80 and results in write pole 48 with sidewalls 78 that have a larger sidewall angle 8s and that are steeper.

Carbon hard mask 84 has many advantages. Carbon hard mask 84 has a high hardness and, as described above, has a higher etch/mill resistance than other hard mask materials such as alumina. Carbon hard mask 84 is also chemically inert. Further, carbon hard mask 84 can be patterned by oxygen or hydrogen plasma and can be dry striped under the same conditions as photoresist 88.

Figure 9:
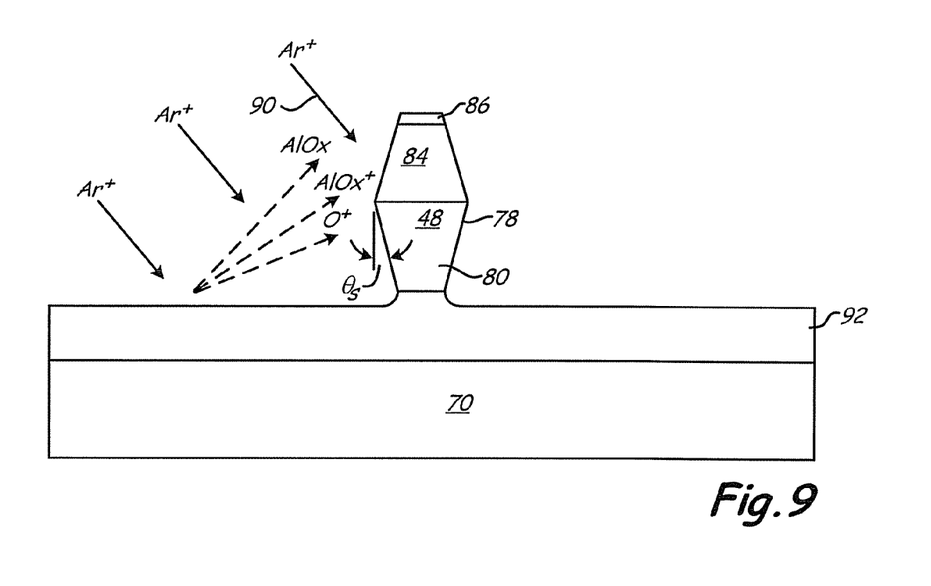
FIG. 9 is a cross-sectional view of a write pole having an alumina insulating layer in place of the non-magnetic, oxygen-free buffer layer during an argon ion milling process.

However, carbon hard mask 84 is very sensitive to oxygen, such as oxygen containing byproducts generated during the ion mill/etching process. FIG. 9 is a cross-section of a write element during the milling process and illustrates the effect of oxygen on carbon hard mask 84. During argon milling, energetic $AlO_x$ radicals, $AOl_x+$ radicals and 0+ ions are produced by alumina insulating layer 92. These oxygen-containing byproducts interact with carbon hard mask 84 to form CO2, which is a highly volatile product. The high energy oxygen radicals and ions increase the mill rate of carbon hard mask 84 so that carbon hard mask 84 will mill at a faster rate than write pole material 80. As carbon hard mask 84 is milled away, write pole material 80 at trailing edge 20 is also milled away. This reduces the width of write pole material 80 at trailing edge 20 and results in write pole 48 having sidewalls 78 that are less steep (have a smaller sidewall angle 8s).

Other drawbacks of using carbon hard mask 84 with alumina insulating layer 92 include direct redeposition of the AlOx radicals produced during the milling process on carbon hard mask 84, and argon ion induced mixing/reactions on sidewalls 78. The direct redeposition of the $AlO_x$ radicals and the argon ion induced mixing/reactions form an intermix material on sidewall 88 that is soft and that is milled at a faster rate than carbon hard mask 84. The $AlO_x$ radicals and argon ions reduce the width of write pole material 80 at trailing edge 20 and result in write pole 48 having sidewalls 78 that are less steep (have a smaller sidewall angle 8s).

By replacing alumina insulating layer 92 with oxygen-free buffer layer 72, oxygen derivative byproducts (such as ions and high energy radicals) are minimized or eliminated and the sidewall mill resistivity of carbon hard mask 84 is improved. In one example. oxygen-free buffer layer 72 is formed from non-magnetic refractory metals such as tungsten (W), chromium (Cr), molybdenum (Mo), Vanadium (V), niobium (Nb), tantalum (Ta), hafnium (Hf), zirconium (Zr) and titanium (Ti). In other embodiments, oxygen-free buffer layer 72 is formed from rhenium (Re), ruthenium (Ru), osmium (Os), rhodium (Rh), iridium (Ir), and combinations thereof. In other embodiments, oxygen-free buffer layer 72 is selected from ruthenium (Ru). Refractory metals form stable carbides in the presence of carbon. During redeposition and ion-induced reactions on sidewalls 78 during the milling of write pole 48, the refractory metal of carbon hard mask 84 forms intermediate carbide surface layers having high mill resistivity (low mill rate). In another example, carbon hard mask is formed from non-magnetic, non-oxide nitrides, carbides or borides such as AlN, $B_4C$, TaC, TiN, $TiB_2$, WC, HfC and $Cr_3C$. These are hard materials that form stable redeposit intermediate surface layers during the milling process. Oxygen-free buffer layer 72 does not produce radicals or ions during the milling process that adversely affect the mill rate of carbon hard mask 84.

Together oxygen-free buffer layer 72 and carbon hard mask 84 provide high resolution imaging of write pole material 80. The use of oxygen-free buffer layer 72 reduces or eliminates "oxygen poisoning" of carbon hard mask 84, producing write pole 48 having steeper sidewalls 78 because of the low mill rate and improved sidewall mill resistance of carbon hard mask 84. Further, the low mill rate and improved sidewall mill resistance of carbon hard mask 84 means that a thinner carbon hard mask 84 can be used while still achieving an accurate patterning of write pole material 80, allowing carbon hard mask 84 to be used at technology nodes of sub-100 nm and beyond.

Examples

The present invention is more particularly described in the following example that is intended as illustration only, since numerous modifications and variations within the scope of the present invention will be apparent to those skilled in the art.

Two layered substrates, layered substrate A and layered substrate B, were prepared using methods known in the art. Layered substrate A was formed by depositing the following materials in the order presented on a substrate: an oxygen-free buffer layer formed of tantalum (Ta), a write pole material formed of FeCo, a CMP etch layer formed of amorphous carbon, a spacer layer formed of alumina, a carbon hard mask formed of amorphous carbon, a cap layer formed of SiON and a photoresist. Layered substrate B was formed by depositing the following materials in the order presented on a substrate: an alumina insulating layer, a write pole material formed of FeCo, a CMP etch layer formed of amorphous carbon, a spacer layer formed of alumina, a carbon hard mask formed of amorphous carbon, a cap layer formed of SiON and a photoresist. The only difference between layered substrate A and layered substrate B is that layered substrate A contains an oxygen-free buffer layer formed of Ta while layered substrate B contains an alumina insulating layer. Layered substrate A and layered substrate B were processed using the method described above to form a write pole. After each step, the width of the feature formed was measured. Table 1 presents the results.

TABLE 1

| | Layered Substrate A (Ta Oxygen-free buffer layer) | Layered Substrate B (alumina insulating layer) |
|---|---|---|
| Width of photoresist after patterning photoresist | 146 nm | 156 nm |
| Width of cap layer after patterning cap layer | 119 nm | 130 nm |
| Width of carbon hard mask after patterning carbon hard mask | 149 nm | 146 nm |
| Width of carbon had mask after argon ion milling | 145 nm | 108 nm |

As shown in Table 1, the widths of the measured features vary only slightly between layered substrate A and layered substrate B up until the argon ion milling. Before the milling process, the carbon hard mask of layered substrate A had a width of about 149 nm. After the milling process, the carbon hard mask on layered substrate A, and thus the trailing edge of the write pole under the carbon hard mask, had a width of about 145 nm. The carbon hard mask on layered substrate A experienced little erosion during the argon milling process.

In contrast, the carbon hard mask on layered substrate B experienced about 38 nm of erosion of its width. Layered substrate B illustrates the effects of oxygen poisoning on the carbon hard mask. During the argon etch process, oxygen containing radicals and ions were produced by the alumina insulating layer on layered substrate B. These radicals and ions increase the mill rate of the carbon hard mask. As a result, the carbon hard mask on layered substrate B was partially removed during the mill process, resulting in a narrower carbon hard mask after the milling process. The carbon hard mask on layered substrate A experienced little to no change in width because an oxygen-free buffer layer was used in place of the alumina insulating layer of layered substrate B. The oxygen-free buffer layer eliminates not only the source of oxygen contamination but also eliminates possible attacks on the carbon hard mask by ion mill byproducts, such as reactive ions and radicals produced in the milling process.

The width of the carbon hard mask after the milling process can also be compared to the width of the photoresist to determine the accuracy of the patterning. For layered substrate A, the width of the carbon hard mask is about 10 angstroms wider than the width of the patterned photoresist. Therefore, layered substrate A having a Ta oxygen-free buffer layer has a critical dimension (CD) bias of about 10 angstroms. In comparison, for layered substrate B, the width of the carbon hard mask is about 480 angstroms wider than the width of the patterned photoresist, and layered substrate B has a CD bias of about 480 angstroms. The Ta oxygen-free buffer layer of layered substrate A produces a write pole having a smaller CD bias compared to using an alumina insulating layer.

Further, the write pole fabricated from layered substrate A had steeper sidewalls than the write pole fabricated from layered substrate B. The write pole of layered substrate A had sidewalls having a sidewall angle (or wall angle) greater than about 7°, and more specifically the sidewalls had a wall angle of about 10°. In comparison, the sidewalls of the write pole formed from layered substrate B had a wall angle of about 7°. The Ta oxygen-free buffer layer eliminated oxygen poisoning of the carbon hard mask. Thus, the carbon hard mask was able to maintain the width of the trailing edge of the write pole while the portion of the write pole not covered by the carbon hard mask was milled into a trapezoidal shape. On layered substrate B, oxygen radicals and ions produced by the alumina insulating layer during the argon milling increased the etch rate of the carbon hard mask. This increase in etch rate caused a portion of the carbon hard mask to be removed during the milling process. Thus, the carbon hard mask could not maintain the width of the trailing edge of the write pole and the angles of the sidewalls of the write pole were less steep.

Although the present invention has been described with reference to preferred embodiments, workers skilled in the art will recognize that changes may be made in form and detail without departing from the spirit and scope of the invention. For example, although the present invention has been described with reference to argon ion milling, write pole 48 can also be formed by a reactive ion beam etch process.

What is claimed is:

1. A magnetic writer comprising:
    a write pole having a trapezoidal shape, a leading edge side, a trailing edge side, a first side and a second side, the write pole having a width of less than about 100 nanometers and a wall angle greater than about 7 degrees from vertical;
    a substrate at the leading edge side of the write pole; and
    a non-magnetic, oxygen-free buffer material located between the write pole and the substrate, the oxygen-free buffer material comprises Re, Ru, Os, Rh, Ir, or combinations thereof.

2. The magnetic writer of claim 1, wherein the non-magnetic, oxygen-free buffer material comprises Ru.

3. The magnetic writer of claim 1, and further comprising an insulator located at the first side and the second side of the write pole.

4. The magnetic writer of claim 1, and further comprising a chemical mechanical polishing stop layer on the trailing edge side of the write pole.

5. A magnetic writer comprising:
    a write pole having a trapezoidal shape at an air bearing surface, the write pole having a width of less than about 100 nanometers and a wall angle greater than about 7 degrees from vertical;
    a substrate;
    a non-magnetic, oxygen-free buffer material located between the write pole and the substrate, the oxygen-free buffer material comprises Re, Ru, Os, Rh, Ir, or combinations thereof;
    a stop layer on an opposite side of the write pole as the non-magnetic, oxygen-free buffer material; and
    an insulator surrounding the write pole and the stop layer.

6. The magnetic writer of claim 5, wherein the oxygen-free buffer material comprises Ru.

* * * * *